(No Model.)

2 Sheets—Sheet 1.

J. MUSGRAVE.
OSCILLATING VALVE.

No. 309,558. Patented Dec. 23, 1884.

Witnesses.
W. R. Haight
W. S. McArthur

Inventor
John Musgrave
by W. H. Babcock
Attorney (No Model.) 2 Sheets—Sheet 2.

J. MUSGRAVE.
OSCILLATING VALVE.

No. 309,558. Patented Dec. 23, 1884.

Witnesses:
W. R. Haight
H. S. McArthur

Inventor
John Musgrave
by W. H. Babcock
Attorney

UNITED STATES PATENT OFFICE.

JOHN MUSGRAVE, OF BOLTON, COUNTY OF LANCASTER, ENGLAND.

OSCILLATING VALVE.

SPECIFICATION forming part of Letters Patent No. 309,558, dated December 23, 1884.

Application filed October 9, 1884. (No model.) Patented in England September 6, 1883, No. 4,293.

*To all whom it may concern:*

Be it known that I, JOHN MUSGRAVE, a subject of the Queen of Great Britain, residing at Bolton, in the county of Lancaster, England, have invented a new and useful Improvement in Operating Oscillating Valves of Motive-Power Engines, (for which I have obtained a patent in Great Britain, No. 4,293, bearing date September 6, 1883,) of which the following is a specification.

My invention relates to improvements in oscillating valves, and the object of my improvements is to give a longitudinal or traversing motion to the valve during the time that it is oscillating to open and close the port. This has been heretofore accomplished by the use of screw-threads or wedge-faces acting on the spindle or attachments thereof. I make use, instead, of a cane-faced ring, which is partly turned by the turning of the spindle in one direction, and, consequently bearing against a collar on said spindle, moves the spindle and valve longitudinally, so as to distribute the wear evenly over the face of the valve-seat.

Figure 2:
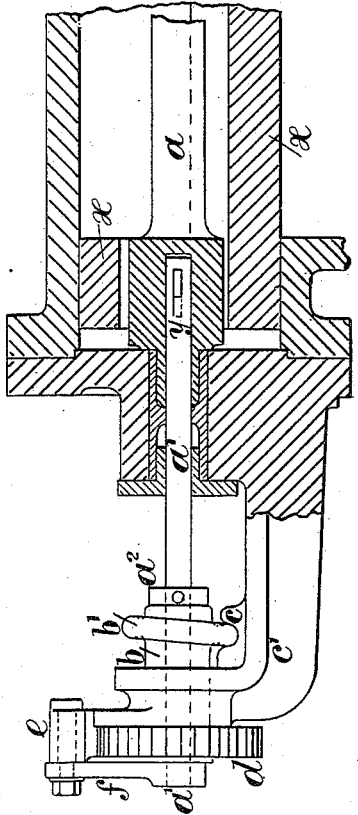
Figure 1:
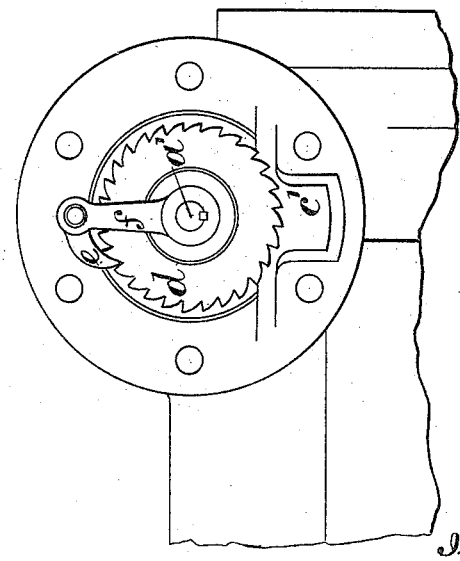
Figure 4:
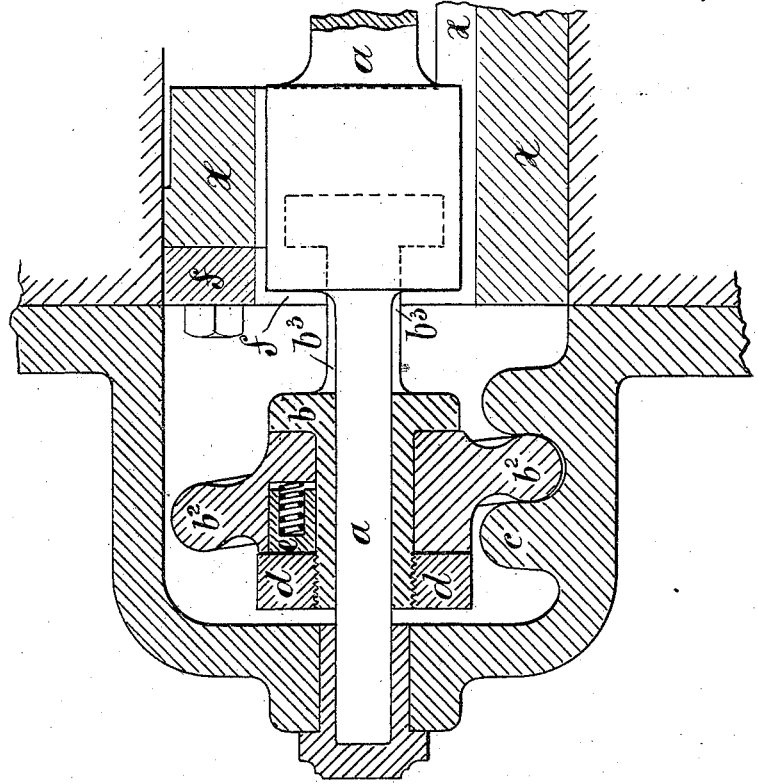
Figure 3:
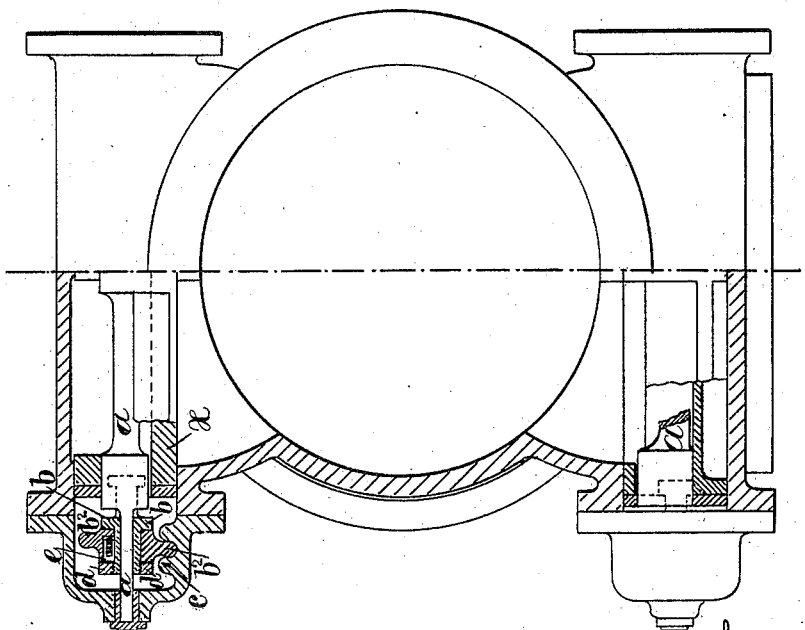

Figure 1 is an end view, and Fig. 2 an elevation, partly in section, of part of an oscillating valve to which my invention is applied. Figs. 3 and 4 are views, partly in section, of a modification of my invention.

Similar letters refer to similar parts throughout the several views.

In Figs. 1 and 2 I form the valve $x$ as usual, and pass the valve-spindle through a stuffing-box at each end. I make the spindle in two parts, $a$ $a'$. The valve $x$ is free to slide longitudinally on the part $a$, to which are secured the ordinary levers (not shown in the drawings) for actuating the valve, and the part $a'$ fits into the end of the part $a$ in which is a slot, $y$. The spindle $a'$ is secured to the valve $x$ and to the spindle $a$ by a cotter passing through the slot $y$. The slot $y$ is long enough to allow the spindle $a'$ and the valve $x$ to move longitudinally, as hereinafter described, without moving the spindle $a$.

$a^2$ is a fixed collar on the spindle $a'$, and $b$ is a loose collar on the same, on which is formed an eccentric ring, $b'$, the periphery of which fits in the recess or bearing $c$ in the bracket $c'$. On the other end of the loose collar $b$, which passes through a bearing in the bracket $c'$, is fixed the ratchet-wheel $d$, to which motion is imparted by the pawl $e$ on the lever $f$, which is fixed on the end of the spindle $a'$. When the valve $x$ oscillates to open or close the port, the lever $f$ on the spindle $a'$ also oscillates, and the pawl $e$ causes the wheel $d$ and loose collar $b$ to make part of a revolution at each forward movement of the valve, and the eccentric ring $b'$, being moved in the stationary recess or bearing, $c$, imparts a longitudinal motion to the spindle $a'$, and so to the valve simultaneously with the oscillating movement, thereby altering the position of the valve on its seat, thus insuring greater durability of the working-faces of the valve. The pawl $e$ may be taken out of gear with the ratchet-wheel $d$, when desired to stop the longitudinal motion of the valve.

In the modification of my invention illustrated in Figs. 3 and 4 I dispense with the stuffing-box on the back bonnet and communicate the longitudinal movement to the valve by an eccentric ring and ratchet-wheel inclosed in the back bonnet.

$a$ is the valve-spindle, on which is the loose collar $b$, formed with T-arms $b^3$, parallel with and outside the valve-spindle $a$, the ends of which arms are secured in a recess in the valve $x$ by a plate, $f$. On one end of the loose collar $b$ is screwed or otherwise fixed the ratchet-wheel $d$.

$b^2$ is the eccentric ring, which fits in the recess $c$, and is loose on the collar $b$. In this ring $b^2$ is the pawl or catch $e$, pressed forward by a spiral spring into contact with teeth formed on the side of the ratchet-wheel $d$. When the valve $x$ moves forward or oscillates to open the port, the teeth on the ratchet-wheel $d$ bear against the pawl $e$ and turn it and the eccentric ring $b^2$ partly round, thereby moving the collar $b$ with the T-arms $b^3$ and the valve $x$ longitudinally. When the valve $x$ moves backward to close the port, the ratchet-teeth press the pawl inward and pass over it without turning the ring $b^2$.

An eccentric ring or collar might be fixed on the valve-spindle and enter a recess or bearing to effect the same object.

By the use of my invention the leakage of oscillating valves is reduced to a minimum and their durability is greatly increased.

What I claim as my invention, and desire to secure by Letters Patent of the United States, is—

1. In combination with an oscillating valve and valve-spindle, an eccentric ring in contact with a collar or flange of said spindle, a grooved bearing which receives the peripheral part of said ring, and a pawl and ratchet, whereby the turning of said spindle in one direction causes said ring to turn in said bearing and against said collar, and thereby move the valve-spindle and valve longitudinally, as set forth.

2. The combination of the oscillating valve $x$ and spindle $a$ with the loose collar $b$, secured by T-arms $b^3$ to the said valve $x$, the said collar $b$ having fixed upon it a ratchet-wheel, $d$, and fitted loosely upon it an eccentric ring, $b^2$, fitting in the stationary bearing $c$, the said ring $b^2$ being provided with the spring-pawl $e$, engaging with the teeth of the wheel $d$, substantially as herein shown and described, for the purposes specified.

The foregoing specification of my improvement in operating oscillating valves of motive-power engines signed by me this 22d day of September, 1884.

JOHN MUSGRAVE.

Witnesses:
ROBERT WINDER,
H. B. BARLOW.